US009857007B2

(12) United States Patent
Piontek et al.

(10) Patent No.: US 9,857,007 B2
(45) Date of Patent: Jan. 2, 2018

(54) REPAIR CLAMP BOLT RETAINING ASSEMBLY

(71) Applicant: Total Piping Solutions, Inc., Olean, NY (US)

(72) Inventors: Daryl M. Piontek, Great Valley, NY (US); Raymond C. Minich, Bradford, PA (US)

(73) Assignee: Total Piping Solutions, Inc., Olean, NY (US)

( * ) Notice: Subject to any disclaimer, the term of this patent is extended or adjusted under 35 U.S.C. 154(b) by 0 days.

(21) Appl. No.: 15/490,695

(22) Filed: Apr. 18, 2017

(65) Prior Publication Data

US 2017/0343137 A1 Nov. 30, 2017

Related U.S. Application Data

(60) Provisional application No. 62/342,367, filed on May 27, 2016.

(51) Int. Cl.
| | |
|---|---|
| *F16L 21/00* | (2006.01) |
| *F16L 21/06* | (2006.01) |
| *F16L 21/02* | (2006.01) |

(52) U.S. Cl.
CPC .............. *F16L 21/065* (2013.01); *F16L 21/02* (2013.01)

(58) Field of Classification Search
USPC .................................. 285/420, 419, 373, 27
See application file for complete search history.

(56) References Cited

U.S. PATENT DOCUMENTS

| | | | | |
|---|---|---|---|---|
| 3,088,185 A | * | 5/1963 | Smith ................... | F16L 55/172 138/99 |
| 3,089,212 A | * | 5/1963 | Graham ................ | F16L 55/172 138/99 |
| 3,173,450 A | * | 3/1965 | Halterman ............ | F16L 55/172 138/97 |
| 3,189,970 A | * | 6/1965 | Barr ...................... | F16L 55/172 138/99 |
| 3,204,665 A | * | 9/1965 | Faint ..................... | F16L 55/172 138/99 |
| 3,472,537 A | * | 10/1969 | Paterson ................ | F16L 41/06 138/99 |
| 3,700,008 A | * | 10/1972 | Hackman .............. | F16L 21/005 138/99 |
| 3,848,638 A | * | 11/1974 | Huslander ............. | F16L 55/172 138/99 |
| 4,409,708 A | * | 10/1983 | Hauffe ................... | F16L 41/12 138/99 |
| 4,413,388 A | * | 11/1983 | Akhtar-Khavari ...... | F16L 33/04 138/99 |

(Continued)

*Primary Examiner* — Aaron Dunwoody
(74) *Attorney, Agent, or Firm* — Harter Secrest & Emery LLP; Rowland Richards, Esq.

(57) ABSTRACT

A repair clamp bolt retaining assembly having a band with first and second edges and a gap there between, first and second lug elements extending from the band on opposite sides of the gap, multiple bolts configured to extend transversely from bolt receiving openings in the first lug element to bolt receiving openings in the second lug element, and a bolt retainer on at least one of the multiple bolts on the inner side of the opening in the second lug element and configured such that the bolt retainer does not pass through the openings in the second lug element.

11 Claims, 5 Drawing Sheets

(56) References Cited

U.S. PATENT DOCUMENTS

| | | | | |
|---|---|---|---|---|
| 4,606,377 | A * | 8/1986 | Montgomery | F16L 55/172 138/99 |
| 4,889,167 | A * | 12/1989 | Morris | F16L 55/172 138/110 |
| 8,047,577 | B2 * | 11/2011 | Zeiber | F16L 33/23 285/242 |
| 8,408,606 | B2 | 4/2013 | Krausz et al. | |
| 8,439,408 | B2 * | 5/2013 | Glocer | F16L 41/06 24/279 |
| 2003/0205899 | A1 * | 11/2003 | Bishop | F16L 21/005 285/373 |
| 2016/0109051 | A1 * | 4/2016 | Sudar | F16L 33/04 138/97 |
| 2016/0195205 | A1 * | 7/2016 | Webb | F16L 59/182 285/53 |
| 2016/0298802 | A1 * | 10/2016 | Piontek | F16L 21/00 |

* cited by examiner

REPAIR CLAMP BOLT RETAINING ASSEMBLY

PRIORITY CLAIM TO PRIOR APPLICATION

This patent application claims benefit of U.S. Provisional Patent Application No. 61/342,367 filed May 27, 2016, the contents of which are incorporated herein by reference.

TECHNICAL FIELD

The present invention relates generally to the field of repair clamps, and more particularly to an improved clamp bolt retaining assembly.

BACKGROUND ART

Repair clamps are used in the placement of pipes or for connecting the ends of pipes axially. Such clamps generally have a cylindrical body or band which encircles the subject pipe or pipe ends. Two opposed lugs are attached to the opposed edges of the cylindrically-shaped band, and the lugs are drawn towards each other by tightening bolts or fasteners that extend between the lugs. This reduces the affective internal diameter of the band, which in turn compresses an elastomeric sheet gasket that is typically placed between the band and the subject pipe. Compressing the gasket sheet seals the gasket to the pipe. To bridge the gap that is formed between the ends of the band, a spanner or bridge plate molded into or placed onto the outer surface of the gasket is employed to provide gasket compression across the gap. The spanner plate fits on the outer surface of the elastomeric sheet gasket and is compressed radially inward by the lugs along the opposed edges of the cylindrical band. The lug pairs have projecting fingers with corresponding matching opposing finger contact lands that place the finger to land contact surfaces parallel to the finger motion direction and parallel to the axis of the tightening bolts of the system.

BRIEF SUMMARY

With parenthetical reference to corresponding parts, portions or surfaces of the disclosed embodiment, merely for the purposes of illustration and not by way of limitation, an improved clamp assembly (15) is provided comprising a band (16) configured to clamp to a fluid conduit (17) orientated about a longitudinally extending axis (x-x); the band comprising a first longitudinally extending edge (19) and a second longitudinally extending edge (20) and a gap (33) between the first longitudinally extending edge and the second longitudinally extending edge; a first lug element (22) extending from the band on a first side of the gap and a second lug element (23) extending from the band on a second side of the gap; the first lug element comprising multiple longitudinally spaced bolt receiving openings (24a-d) and the second lug element comprising multiple longitudinally spaced bolt receiving openings (25a-d); multiple bolts (26a-d) configured to extend transversely between the first lug element and the second lug element from one of the bolt receiving openings in the first lug element to one of the bolt receiving openings in the second lug element; at least one of the multiple bolts (26b) having a first end portion (27b) configured to extend beyond at least one of the openings (24b) in the first lug element and having a second end portion (30b) distal from the first end portion (27b) and passing through at least one of the openings (25b) in the second lug element from an inner side (64) of the opening in the second lug element to an outer side (65) of the opening in the second lug element; and a bolt retainer (50) on the bolt (26b) configured such that the bolt retainer does not slide through the opening (25b) in the second lug element; and the bolt retainer positioned on the bolt closer to the second end portion (27b) of the bolt than the first end portion (30b) of the bolt and on the inner side (64) of the opening in the second lug element.

The bolt retainer may comprise an outer tapered centering portion (51) configured to extend into the opening in the second lug element. The at least one bolt may comprise a shank selectively movable through the bolt retainer. The bolt retainer may comprise a cylindrical opening (68) having an inner diameter (69), the bolt may comprise a threaded cylindrical shank having an outer diameter (70), and the cylindrical shank may extend through the cylindrical opening in the bolt retainer. The inner diameter of the opening in the bolt retainer may be substantially equal to the outer diameter of the shank of the bolt. The bolt retainer may comprise an inwardly-extending annular ridge (52) in sliding engagement with the bolt. The bolt retainer may be formed of an elastomeric material or a plastic material.

The assembly may further comprise a member (38) configured to span the gap between the first longitudinally extending edge and the second longitudinally extending edge of the band and a gasket (18) disposed between the band and the fluid conduit. The first lug element may comprise multiple longitudinally spaced and transversely extending lug fingers (39a-c), each of the fingers having a finger bearing surface; the second lug element may comprise multiple longitudinally spaced lug finger lands (31a-c), each of the lug finger lands having a bearing surface; each of the lug fingers of the first lug element may extend transversely between the first lug element and the second lug element such that each of the finger bearing surfaces of the lug fingers bear against one of the bearing surfaces of the lug finger lands. The second lug element may comprise multiple longitudinally spaced and transversely extending lug fingers (40a-c), each of the fingers having a finger bearing surface; the first lug element may comprise multiple longitudinally spaced lug finger lands (41a-c), each of the lug finger lands having a bearing surface; each of the lug fingers of the second lug element may extend transversely between the second lug element and the first lug element such that each of the finger bearing surfaces of the lug fingers of the second lug element bear against one of the bearing surfaces of the lug finger lands of the first lug element. The bolt receiving openings in the first lug element may comprise an open slot and the bolt receiving openings in the second lug element may comprise a cylindrical through-bore. The clamp may be configured as a tapping sleeve or a multi-paneled repair clamp, wherein the band comprises a first shell member having the first longitudinally extending edge and a second shell member having the second longitudinally extending edge, the second shell member separate from the first shell member, and wherein the first shell member has a third longitudinally extending edge and the second shell member has the fourth longitudinally extending edge, and wherein the connecting assembly further comprises a third lug element connected proximate to the third longitudinally extending edge of the band and a fourth lug element connected proximate to the fourth longitudinally extending edge of the band, whereby the third longitudinally extending edge and the fourth longitudinally extending edge may be drawn towards each other to tighten the band to the fluid conduit.

DETAILED DESCRIPTION OF THE EMBODIMENTS

Figure 1:
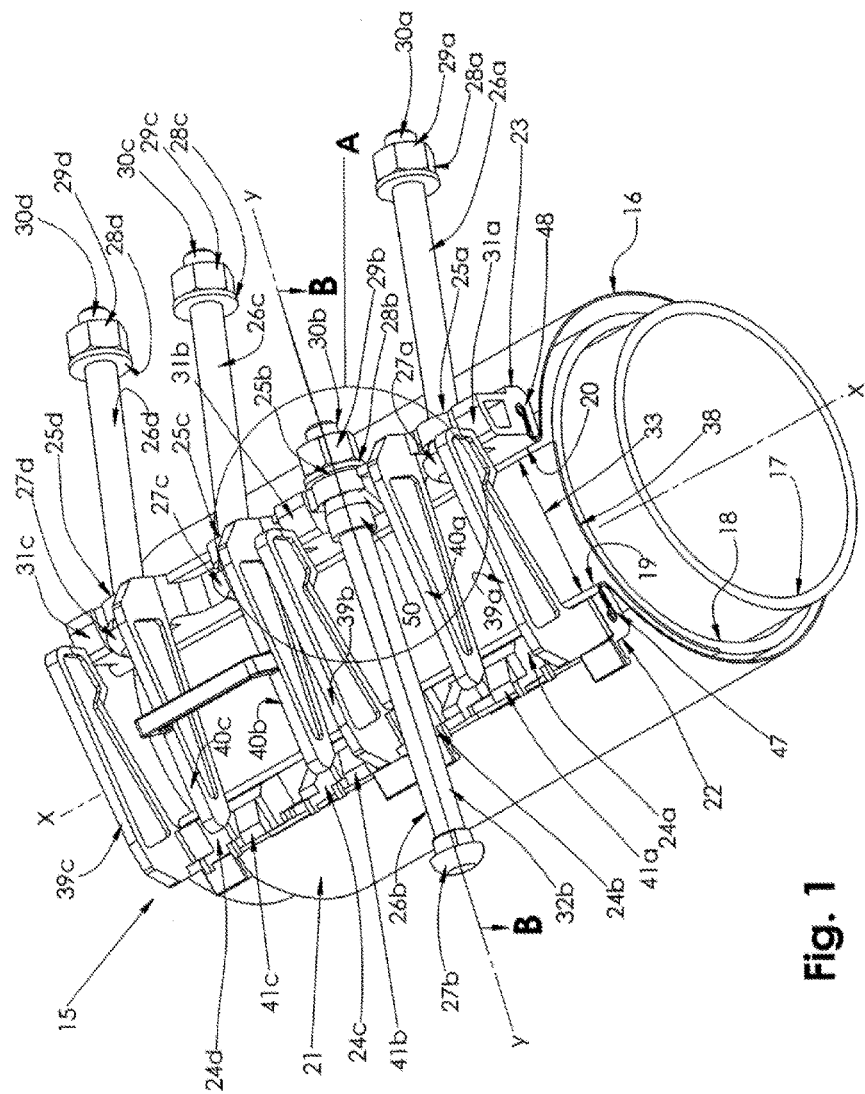
FIG. 1 is a top isometric view of an embodiment of the improved repair clamp bolt retaining assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
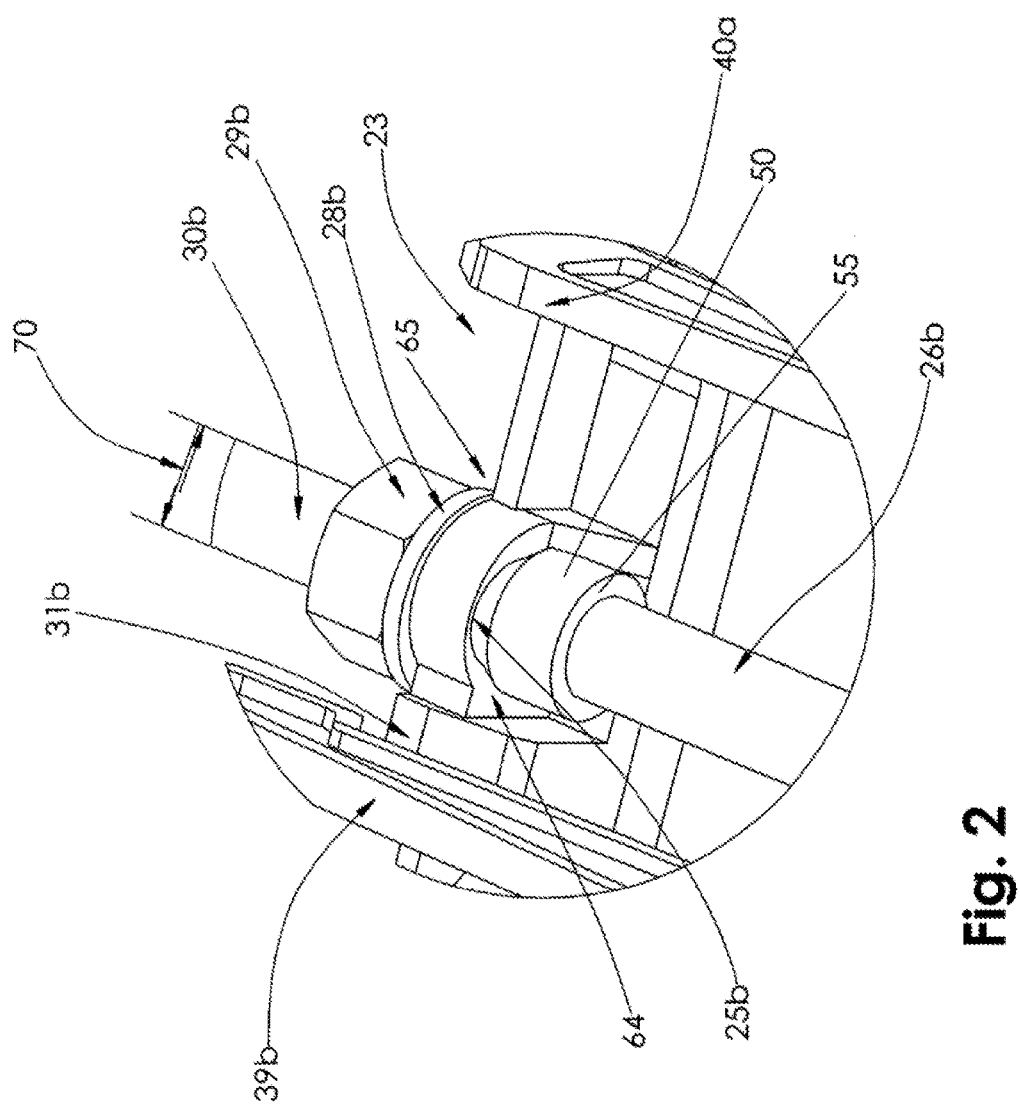
FIG. 2 is an enlarged detailed view of the bolt retaining assembly shown in FIG. 1, taken generally within the indicated circle A of FIG. 1.
Figure 3:
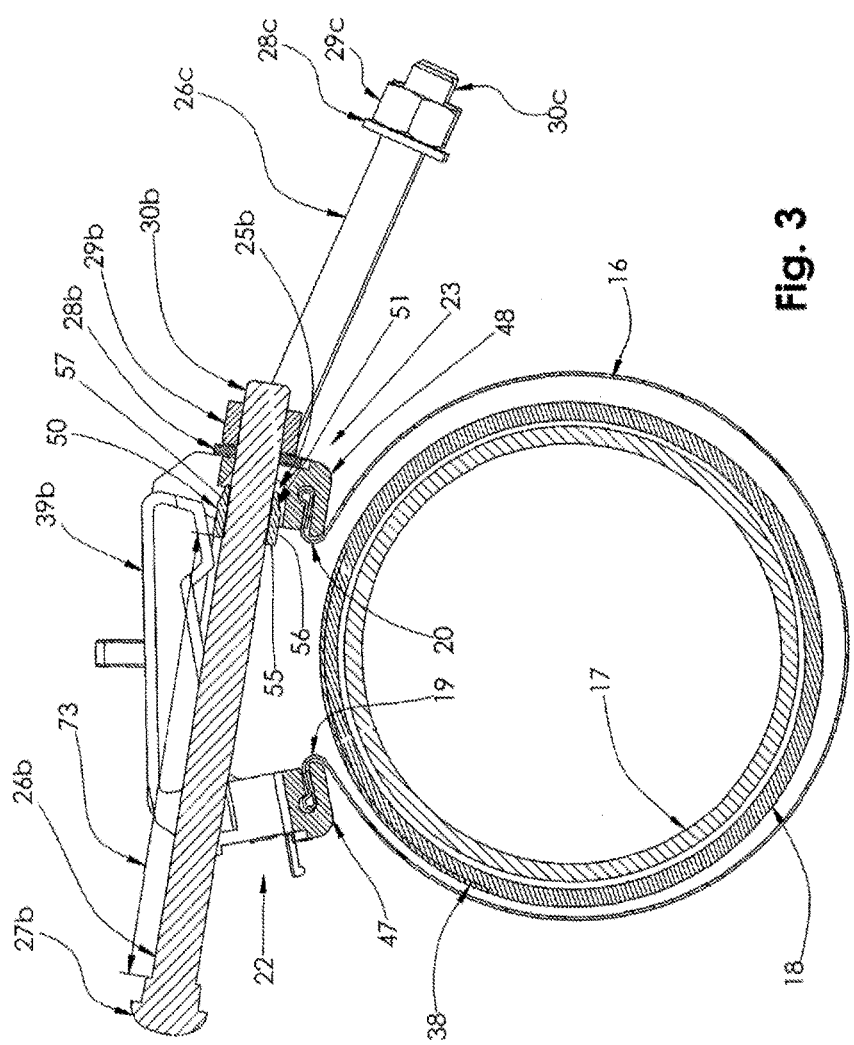
FIG. 3 is a transverse vertical cross-sectional view of the bolt retaining assembly shown in FIG. 1, taken generally on line B-B of FIG. 1.
Figure 4:
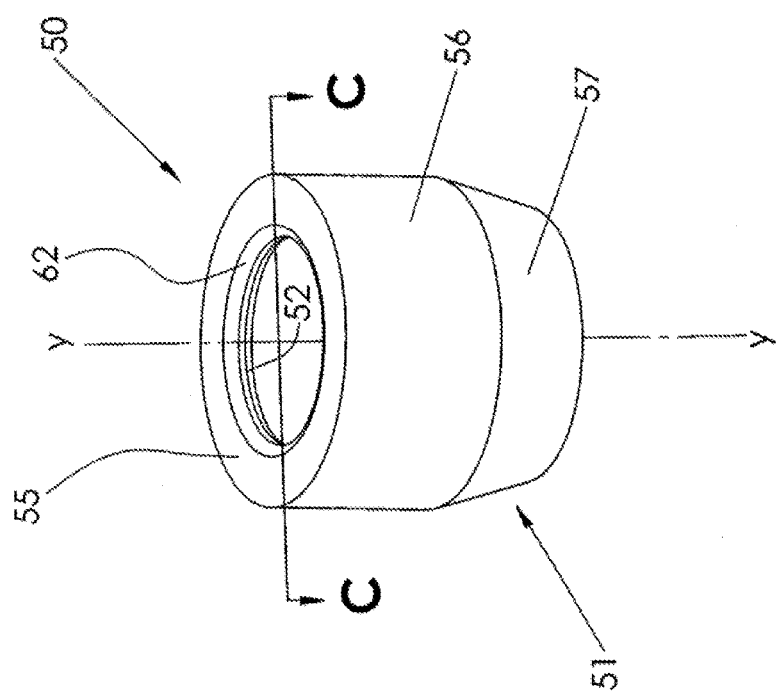
FIG. 4 is an enlarged isometric view of the bolt retainer shown in FIG. 2.

Referring now to the drawings, and more particularly to FIG. 1 thereof, an improved repair clamp and gasket assembly is provided, of which a first embodiment is generally indicated at 15. As shown in FIGS. 1-3, assembly 15 generally comprises band 16, which has two longitudinally extending opposed edges 19 and 20 and in operation is circumferentially disposed on the outside of pipe or fluid conduit 17, spanner 38, which in operation extends circumferentially across the gap between edges 19 and 20 of band 16, gasket 18, which in operation is disposed between pipe 17 and both band 16 and spanner 38, and connecting assembly 21, which in operation spans the gap between edges 19 and 20 of band 16 and is used to draw edges 19 and 20 together. Connecting assembly 21 is attached to band 16 at connections 47 and 48 near or proximate to longitudinally extending edges 19 and 20 of band 16, respectively.

As shown, band 16 is a thin semi-cylindrical metal member configured and arranged to be tightened around pipe 17 with connection assembly 21. Band 16 has two longitudinally extending opposed edges 19 and 20.

Gasket 18 is a flexible elastomeric matte gasket sheet having specially contoured sealing features and which is disposed between the inner surfaces of band 16 and spanner 38 and the outer cylindrical surface of pipe 17. Thus, gasket 18 is sandwiched between the inside semi-cylindrical surfaces of band 16 and spanner 38 and the outside cylindrical surface of conduit 17 to provide sufficient sealing force to prevent leakage of fluid. Elastic or sealing energy is imparted into assembly 15 by tightening connecting assembly 21 from a loosened or a non-actuated position to a tightened sealed position.

As shown, spanner 38 is a metallic strip that spans arc-shaped gap 33 between opposed longitudinally extending edges 19 and 20 of band 16. The interior edges and surfaces of band 16 that are in contact with spanner 38 apply a normal force or pressure that is directed radially inward toward the center axis of pipe 17, which develops the necessary sealing pressure between spanner 38 and pipe 17. Spanner 38 is designed to compress gasket 18 across gap 33 between longitudinally extending edges 19 and 20 of band 16.

In one embodiment, the right side of spanner plate 38 is mechanically attached to lug 23. As an alternative, without limitation, spanner 38 may be attached to gasket 18 and gasket 18 in turn at least partially attached to band 16. In these embodiments, the right side of spanner 38 is thereby stationary relative to lug 23 and edge 20 of band 16. The result is that lug 23 acts as a non-moving or anchored lug and spanner 38 is thereby restricted such that it does not slide or skate relative to lug 23. Opposing lug 22 and edge 19 of band 16 is intended to slide translate or slip over the outer surface of spanner 38, and thereby provide band diameter reduction and gasket compression upon the tightening of assembly 21. As bolts 26a and 26b of connecting assembly 21 are tightened, a radially orientated inward force is applied to spanner 38.

Connecting assembly 21 generally includes lug element 22, lug element 23, bolts 26a-d extending there between, and bolt retainer 50 on bolt 26b. As shown in FIGS. 1 and 2, the base of lug 22 is connected at connection 47 to band 16 proximate to longitudinally extending edge 19, which is coincident with longitudinal axis x-x of pipe 17. Similarly, the base of lug 23 is connected at connection 48 to band 16 proximate to longitudinally extending edge 20, which is coincident with longitudinal axis x-x of pipe 17. As shown, in this embodiment, band edges 19 and 20 each have a longitudinally extending P-shaped edge and the base portions of lugs 22 and 23 include a longitudinally P-shaped slot configured and arranged to receive the P-shaped edge of band 16. The P-shaped edge of the band edges may thereby be slid into the P-shaped slot in the base of the respective lugs to provide a mechanical connection such that the edges of band 16 move transversely with tightening of bolts 26 and lugs 22 and 23 of connecting assembly 21. Other mechanical connections may be used. For example and without limitation, lug elements 22 and 23 may be welded to edges 19 and 20 of band 16 at connections 47 and 48, respectively.

Lug element 22 includes a plurality of longitudinally spaced bolt receiving slots or grooves 24a-b in the top of the base extending from the left side to the right side thereof. Fingers 39a-c are also spaced longitudinally along the top of base of lug 22 and extend transversely towards lug 23 therefrom. Lands 41a-c are also spaced longitudinally along the top of the base of lug 22.

Lug element 23 includes a plurality of longitudinally spaced bolt hole openings 25a-d extending from left side 64 to right side 65 thereof. Fingers 40a-c are spaced longitudinally along the top of the base of lug 23 and extend transversely toward lug 22 therefrom. Lands 31a-c are spaced longitudinally along the base of lug 23.

In this embodiment, lugs 22 and 23 are forged, extruded or molded and formed of a solid unitary piece. However, it is contemplated that lugs 22 and 23 may be cast as separate pieces and then formed together to provide an assembled part.

Bolt heads 27a-d of bolts 26a-d are configured to abut against the left side of slots 24a-d, respectively, in lug element 22. Corresponding washers 28a-d and nuts 29a-d are tightened on threaded end portions 30a-d of bolts 26a-d that extend through openings 25a-d to right side 65 of openings 25*a*-25*d*, respectively, in lug 23. Bolt heads 27*a*-*c* have an outer diameter greater than the inner diameter of openings 25*a*-*c* in lug 23, and washers 28*a*-*d* and nuts 29*a*-*d* have an outer diameter greater than the inner diameter of openings 25*a*-*c*. Nuts 29*a*-*d*, with washers 28*a*-*d*, on ends 30*a*-*d* of bolts 26*a*-*d* are configured to be tightened against right side 65 of openings 25*a*-*d*, respectively, in lug element 23 to draw opposed lug elements 22 and 23 together, thereby tightening band 16 to pipe 17. Bolts 26*a*-*d* have threaded cylindrical shanks with outer diameter 70.

As shown in FIGS. 1-5, retainer 50 is disposed on at least one of bolts 26*a*-26*d*, in this case starter bolt 26*b*. As shown, starter bolt 26*b* is orientated about axis y-y, generally transverse to conduit axis x-x. Retainer 50 holds bolt 26*b* from sliding linearly to the right through opening 25*b* in lug 23 and transversely away from lug 22. The contact between tapered outer surface 57 and opening 25*b* in lug 23 also acts against rotation of bolt 26*b* about lug 23 and away from slot 24*b*. Thus, retainer 50 generally retains bolt 26*b* in a position and orientation for easy insertion into slot 24*b* of lug 22 such that bolt head 27*b* is on the left or outside of slot 24*b* of lug 22 after wrapping repair clamp 15 around pipe 17. Retainer 50 thereby holds bolt 26*b* in linear position relative to opening 25*b* in lug 23, thereby making it easier for the installer to grasp opposed bolt head 27*b* and place bolt shank portion 32*b* in opposed corresponding slot 24*b* of lug 22. As nuts 29*a*-*d* are tightened on bolts 26*a*-*d*, such tightening force overcomes the contact frictional retaining force between inner surfaces 59-62 of retainer 50 and the outer threaded surface of the shack of bolt 26*b* such that the shank of bolt 26*b* slides to the right through retainer 50 when bolt 26 be is tightened and gap 33 is reduced.

Figure 5:
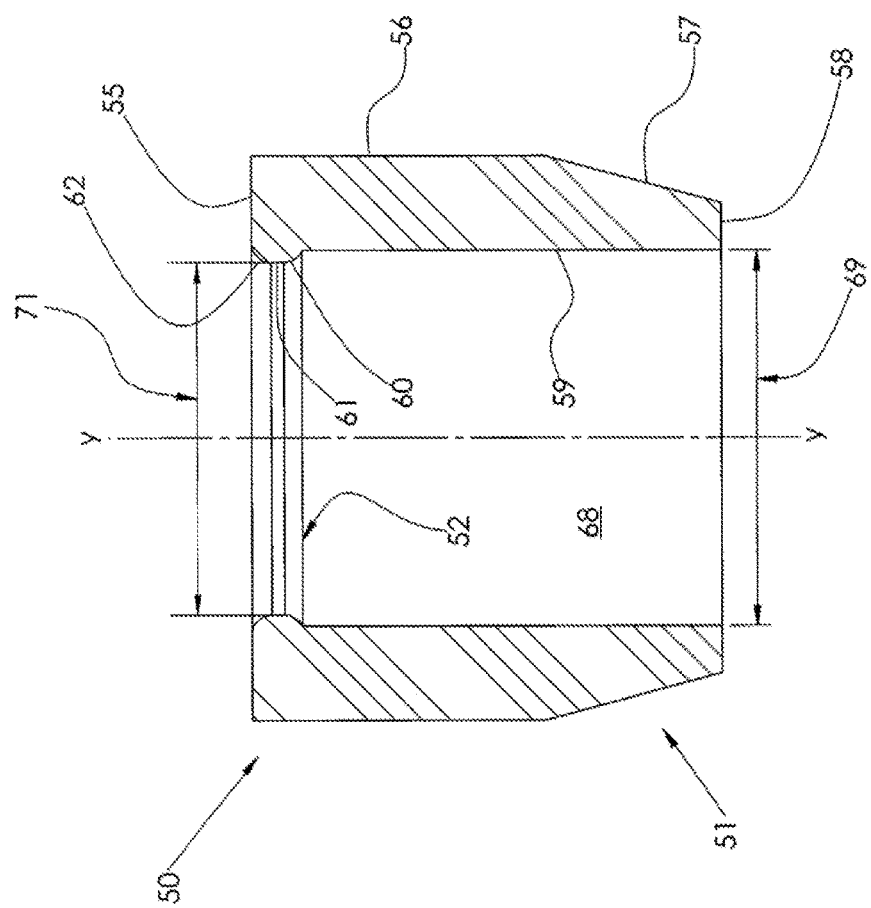
FIG. 5 is a longitudinal vertical cross-sectional view of the bolt retainer shown in FIG. 3, taken generally on line C-C of FIG. 4.

With reference to FIG. 5, retainer 50 is a specially configured ring-like cylindrical member formed about axis y-y, and is generally bounded by upwardly-facing horizontal annular surface 55, outwardly-facing vertical cylindrical surface 56, outwardly and downwardly-facing frustoconical surface 57, downwardly-facing horizontal annular surface 58, inwardly-facing vertical cylindrical surface 59, inwardly and downwardly-facing frustoconical surface 60, inwardly-facing vertical cylindrical surface 61, and inwardly and upwardly-facing frustoconical surface 62, joined at its upper marginal end to the inner marginal end of surface 55.

As shown, surface 57 and 58 define external centering tapered portion 51 that is sized and configured to extend at least partially into opening 25*b* in second lug element 23. External centering tapered portion 51 centers bolt 26*a* in mating hole 25*b* in side lug 23. Surfaces 60, 61 and 62 define inwardly-extending annular ridge 52. Internal ridge 52 increases the resistance to slip of retainer 50 along bolt 26*b*. As shown, retainer 50 is sized so that it does not pass through opening 25*b* in second lug element 23. Cylindrical surface 59 defines cylindrical opening 68 having an inner diameter 69. Inner diameter 69 of opening 68 is substantially equal to outer diameter 70 of the shank of bolts 26*a*-*d*. Surface 61 has a slightly reduced inner diameter 71, with inner ridge 52 being of elastic material such that bolt 26*b* may be inserted in retainer 50 by deforming ridge 52.

As shown, retainer 50 is positioned on bolt 26*b* to the inside 64 of opening 25*b* of lug 23 and on bolt 26*b* closer to lug 23 and end 30*b* of bolt 26*b* than lug 22 and bolt head 27*b* of bolt 26*b*. Thus, retainer 50 is initially positioned on bolt 26*b* inside of opening 25*b* and a distance 73 from bolt head 27*b* that is greater than at least gap 33 the distance between the inside edge of opening 25*b* and the outside edge of slot 24*b*. Due to the relative outer diameter 70 and inner diameter 60 dimensions and resulting frictional contact between the inner cylindrical surface 59 of retainer 50 and the outer threaded surface of bolt 26*b*, retainer 50 does not slide linearly along bolt 26*b* until a linear force along axis y-y is applied between the two that exceeds a threshold frictional restraining force. Internally extending ridge 52 assists in holding retainer 50 in the desired initial longitudinal position 73 along bolt 26*b* at the desired threshold restraining force. Such restraining force is enough that retainer 50 holds bolt 26*b*, with washer 28*b* and nut 29*b* on end 30*b*, from sliding from its own weight through opening 25*b* to the right and away from lug 22. Accordingly, bolt head 27*b* is held in position away from opening 25*b* such that it extends to the left beyond slot 24*b* when bolt 26*b* is rotated down into slot 24*b* of lug 22. In contrast, as shown in FIG. 1, bolts 26*a*, 26*c* and 26*d* are only loosely held within openings 25*a*, 25*c* and 25*d*, respectively, such that they are free to slide through openings 25*a*, 25*c* and 25*d*, respectively, to the rights beyond outside surface 65 until bolt heads 27*a*, 27*c* and 27*d* contact the inside surface 64 of such openings, respectively. This play in the travel of bolts 26*a*, 26*c* and 26*d* makes it difficult for the user to hold the clamp in position around the conduit while at the same time getting any of bolt heads 27*a*, 27*c* and 27*d* positioned in slots 24*a*, 24*c* or 24*d* of lug 22, respectively.

With retainer 50 positioned as described on starter bolt 26*b*, and because retainer 50 holds bolt 26*b* from sliding through opening 25*b*, the installer does not have to reach through and pull bolt 26*b* out through opening 25*b* until bolt head 27*b* is on the outside of slot 24*b* in lug element 22. Instead, bolt 26*b* and bolt head 27*b* already extend and are held in place across gap 33 such that bolt head 27*b* may be easily lowered into proper position. Once bolt head 27*b* is properly positioned to the outside of slot 24*b*, the installer does not need to hold band 16 around the conduit as bolt 26*b* will now hold it in place, now being in tension between bolt head 27*b* against the outside of slot 24*b* of lug 22 and washer 28*b* and nut 29*b* against the outside 65 of opening 25*b* in lug 23. The other bolts 26*a*, 26*c* and 26*d* may then be positioned properly between slots 24*a*, 24*c* and 24*d* in lug 22 and openings 25*a*, 25*c* and 25*d* in lug 23 without fear of band 16 springing loose. The bolts may then be tightened to draw edges 19 and 20 towards each other and close gap 33, thereby compressing gasket 18 between conduit 17 and band 16 to form a seal.

Thus, as shown in FIG. 1, bolts 26*a*, 26*c* and 26*d* that do not have a retainer 50 have fallen through lug bolt holes 25*a*, 25*c* and 25*d* up to their bolt heads 27*a*, 27*c* and 27*d*, respectively, in nut washer side lug 23. When all the bolts are in this extended or dangling position, finding, grasping and orientating starter bolt 26*b* is much more difficult than when one or all the bolts are retained in a non-dangling position. When bolt 26*b* is retained by retainer 50, bolt head 27*b* is thereby orientated much nearer mating lug slot 24*b* in lug 22. When the installer's hand is being used to hold repair clamp 15 in a wrapped position about conduit 17, the retained bolt head 27*b* and shank orientation make bolt 26*b* shank insertion into lug slot 24*b* much more convenient as bolt head 27*b* is already nearer slot 24*b*. Thus, starter bolt 26*b* is held in position by retainer 50 such that bolt 26*b* is easier to grasp and drop into place into mating lug 22 slot 24*b* when repair clamp 15 is installed on conduit 17. Retainer 50 thereby prepositions bolt 16*b* for assembly.

Retainer 50 is placed on bolt 26*b* at initial position 73 by forcing the right threaded end of bolt 26*b* through opening 68 in retainer 50 and then sliding by force retainer 50 towards bolt head 27*b* to desired position 73 from bolt head 27*b*. The threaded end of bolt 26*b* is then passed through opening 25b in lug 23 from inside to outside until retainer 50 is centered in opening 25b and an annular portion of surface 57 abuts against the inner side 64 of opening 25b of lug 23. Washer 28b and nut 29b are rotationally tightened onto the threaded end 30b of bolt 26b extending from the outside of opening 25b in lug 23 until they abut against the outside 65 of opening 26b of lug 23. Bolt 26b is thereby held linearly in initial position 73 relative to lug 23 by retainer 50 on the inside 64 of lug opening 25b of lug 23 and nut 29b on the outside 65 of lug opening 25b of lug 23. When nut 29b is further tightened onto bolt 26b against outside 65 of lug 23 to draw lugs 22 and 23 closer together, such tightening force is enough to force retainer 50 to move along bolt 26b with lug 23 towards bolt head 27b.

Starter bolt 26b may be longer than bolts 26a, 26c and 26d. Additional retainers 50 may be placed in similar positions on bolts 26a, 26c and 26d. Retainer 50 may be fairly easily removed from bolt 26b and replaced if desired. Retainer 50 may be made from elastic material or plastic material.

While this embodiment discloses a single panel pipeline repair clamp configuration, the clamp assembly may be used in other configurations or for other purposes. For example, and without limitation, the clamp assembly may be configured for use in a pipeline saddle clamp, a pipeline tapping saddle, a pipeline tapping sleeve and a multi-paneled pipeline repair clamp.

The present invention contemplates that many changes and modifications may be made. Therefore, while forms of the improved clamp assembly has been shown and described, and a number of alternatives discussed, persons skilled in this art will readily appreciate that various additional changes and modifications may be made without departing from the scope of the invention, as defined and differentiated by the following claims.

The invention claimed is:

1. A clamp assembly comprising:
   a band configured to clamp on to a fluid conduit oriented about a longitudinally extending axis;
   said band comprising a first longitudinally extending edge and a second longitudinally extending edge and a gap between said first longitudinally extending edge and said second longitudinally extending edge;
   a first lug element extending from said band on a first side of said gap and a second lug element extending from said band on a second side of said gap;
   said first lug element comprising multiple longitudinally spaced bolt receiving openings and said second lug element comprising multiple longitudinally spaced bolt receiving openings;
   multiple bolts configured to extend transversely between said first lug element and said second lug element from one of said bolt receiving openings in said first lug element to one of said bolt receiving openings in said second lug element;
   at least one of said multiple bolts having a first end portion configured to extend beyond at least one of said openings in said first lug element and having a second end portion distal from said first end and passing through at least one of said openings in said second lug element from an inner side of said opening in said second lug element to an outer side of said opening in said second lug element;
   a bolt retainer on said at least one of said multiple bolts that is configured such that said bolt retainer does not slide through said opening in said second lug element; and
   said bolt retainer positioned on said bolt closer to said second end portion of said bolt than said first end portion of said bolt and on said inner side of said opening in said second lug element.

2. The clamp set forth in claim 1, wherein said bolt retainer comprises an outer tapered portion configured to extend into said opening in said second lug element.

3. The clamp set forth in claim 1, wherein said at least one of said multiple bolts comprises a shank selectively movable through said bolt retainer.

4. The clamp set forth in claim 1, wherein said bolt retainer comprises a cylindrical opening having an inner diameter, said bolt comprises a threaded cylindrical shank having an outer diameter, and said cylindrical shank extends through said cylindrical opening in said bolt retainer.

5. The clamp set forth in claim 4, wherein said inner diameter of said opening in said bolt retainer is substantially equal to said outer diameter of said shank of said bolt.

6. The clamp set forth in claim 1, wherein said bolt retainer comprises an inwardly-extending annular ridge in sliding engagement with said bolt.

7. The clamp set forth in claim 1, and further comprising a member configured to span said gap between said first longitudinally extending edge and said second longitudinally extending edge of said band and a gasket configured to be disposed between said band and a fluid conduit.

8. The clamp set forth in claim 1, wherein:
   said first lug element comprises multiple longitudinally spaced and transversely extending lug fingers, each of said fingers having a finger bearing surface;
   said second lug element comprises multiple longitudinally spaced lug finger lands, each of said lug finger lands having a bearing surface; and
   each of said lug fingers of said first lug element extending transversely between said first lug element and said second lug element such that each of said finger bearing surfaces of said lug fingers bear against one of said bearing surfaces of said lug finger lands.

9. The clamp set forth in claim 8, wherein:
   said second lug element comprises multiple longitudinally spaced and transversely extending lug fingers, each of said fingers having a finger bearing surface;
   said first lug element comprises multiple longitudinally spaced lug finger lands, each of said lug finger lands having a bearing surface; and
   each of said lug fingers of said second lug element extending transversely between said second lug element and said first lug element such that each of said finger bearing surfaces of said lug fingers of said second lug element bear against one of said bearing surfaces of said lug finger lands of said first lug element.

10. The clamp set forth in claim 1, wherein each of said bolt receiving openings in said first lug element comprises an open slot and each of said bolt receiving openings in said second lug element comprises a cylindrical through-bore.

11. The clamp set forth in claim 1, wherein said bolt retainer is formed of an elastomeric material or a plastic material.

* * * * *